United States Patent [19]
Currie

[11] Patent Number: 5,465,194
[45] Date of Patent: Nov. 7, 1995

[54] OPTICAL FIBER ILLUMINATION DEVICE

[76] Inventor: Joseph E. Currie, R.F.D. 8 17 Lawrence Rd., Hudson, N.H. 03051

[21] Appl. No.: 335,368

[22] Filed: Nov. 3, 1994

Related U.S. Application Data

[63] Continuation-in-part of Ser. No. 132,341, Oct. 6, 1993, Pat. No. 5,400,225.

[51] Int. Cl.$^6$ ................................ B60Q 1/00; F21V 7/04
[52] U.S. Cl. .............................. 362/32; 362/78; 362/80; 340/479; 340/475; 340/468
[58] Field of Search ................................ 362/61, 80, 32, 362/78, 293, 237, 240, 246, 251; 340/479, 468, 475, 478, 472

[56] References Cited

U.S. PATENT DOCUMENTS

| | | | |
|---|---|---|---|
| 3,578,973 | 5/1969 | Dooley et al. | 362/32 X |
| 3,761,706 | 9/1973 | Frey | 362/32 |
| 4,430,692 | 2/1984 | Papadakis | 362/32 |
| 4,758,931 | 7/1988 | Gabaldon | 340/479 |
| 4,808,968 | 2/1989 | Caine | 340/479 |
| 4,896,136 | 1/1990 | Hotovy | 362/80.1 |
| 4,935,722 | 6/1990 | Pollack | 340/479 |
| 4,947,293 | 8/1990 | Johnson | 362/32 |
| 4,977,487 | 12/1990 | Okano | 362/32 |
| 4,996,632 | 2/1991 | Aikens | 362/32 |
| 5,010,319 | 4/1991 | Killinger | 362/80 |
| 5,031,078 | 7/1991 | Bornhorst | 362/32 |
| 5,111,183 | 5/1992 | Wang | 340/479 |
| 5,122,933 | 6/1992 | Johnson | 362/32 |
| 5,150,961 | 9/1992 | Gonzalez | 362/83.2 |
| 5,181,773 | 1/1993 | Colvin | 362/32 X |
| 5,193,893 | 3/1993 | Mitko | 362/32 |

Primary Examiner—Ira S. Lazarus
Assistant Examiner—Thomas M. Sember
Attorney, Agent, or Firm—Richard C. Litman

[57] ABSTRACT

An optical fiber illumination device is disclosed. The optical fiber illumination device includes at least one optical fiber cable, one or more light sources for introducing light into the optical fiber cable, a lens through which light from each light source passes prior to entering the optical fiber cable for producing a colored light, electrical circuitry for energizing the light source, and a housing for containing the circuitry and the light source. A first light source is energized by a first power source. Light emitted from the first light source passes through a first lens which possesses a desired filtering characteristic. Upon application of the second power source, a first control device disable the first light source. Moreover, the second power source may energize a second light source which passes through a second lens having a filtering characteristic distinct from that of the first lens. Upon application of a third power source, a second control device disables the first control device. The device can be used to illuminate auto body parts, such as the wheels, tires and surrounding area. The device operates in cooperation with the brake lights, the parking lights, and the turn signals of a motor vehicle to increase the visibility of the vehicle.

13 Claims, 10 Drawing Sheets

OPTICAL FIBER ILLUMINATION DEVICE

This application is a Continuation-in-Part of application Ser. No. 08/132,341, filed Oct. 6, 1993.

BACKGROUND OF THE INVENTION

1. Field of the Invention

The present invention relates to an optical fiber illumination device and, more particularly, to an optical fiber illumination device for use with a motor vehicle.

2. Description of the Prior Art

An increased emphasis on motor vehicle safety and reliability has presented the need for a clear, distinct, and brighter motor vehicle lighting system to improve the motor vehicle operator's awareness of the presence of surrounding motor vehicles, thereby reducing the risk of costly personal injury and property damage attributable to motor vehicle collisions.

Several attempts have been proposed to address this need. One such attempt is shown in U.S. Pat. No. 5,150,961, issued Sep. 29, 1992, to Jaime D. Gonzalez, which discloses an apparatus for illuminating a motor vehicle license plate. The apparatus includes an annular license plate cover having a channel therein for receiving an annular-shaped neon tube and a high-voltage, high-frequency transformer. The annular-shaped neon tube is connected to the high-voltage, high-frequency transformer, which is connected to the motor vehicle electrical system through a low-voltage, high-frequency power supply. Upon application of the motor vehicle brakes, the neon tube is energized. Though this neon tube emits a brilliant light, it may prove to be less effective than a center-high mounted brake light (i.e. a brake light disposed approximately eye level with trailing motor vehicle operators) in alerting trailing motorists.

Center-high mounted brake lights are well known. In fact, modern legislation or current federal regulations require motor vehicles to possess a center-high mounted brake light in addition to standard brake lights. The center-high mounted brakelight is intended to maximize or greatly enhance the visibility of a braking motor vehicle for motor vehicle operators trailing therebehind.

Generally, center-high mounted brake lights employ a standard lenticular lens and an incandescent lamp enclosed within a housing that is mounted in the motor vehicle rear window on the motor vehicle rear packaging shelf or dash board. An example of a center-high mounted brake light is shown in U.S. Pat. No. 5,111,183, issued May 5, 1992, to Frank Wang. Wang discloses an optical fiber brake lamp including a housing for accommodating a lamp, a focusing lens, and a color board. The lamp is preferably a halogen lamp as opposed to an incandescent lamp. The color board may be a single-color board or a rotatably driven, multi-color board. The color board thoroughly covers the focusing lens. Upon application of the motor vehicle brakes, the halogen lamp emits light through the color board, the focusing lens, and further through a bundle of end-light optical fibers. The end-light optical fibers terminate in a display panel. The single-color board provides a single-color display and the multi-color board provides a multi-color display.

A significant problem associated with center-high mounted brake lights is that the housing typically obscures some portion of the rearward vision of the motor vehicle operator. U.S. Pat. No. 4,935,722, issued Jun. 19, 1990, to Slava A. Pollack, attempts to address this issue. Pollack discloses a transparent center-high brake light for motor vehicles. The brake light includes a crystal in the form of a transparent plate or optical fiber applied to a motor vehicle rear window, and an infrared energy source located at a remote location within the motor vehicle. The crystal, when illuminated by the infrared energy source, produces a visible light.

To further address the issue of obscuring the rearward vision of a motor vehicle operator, center-high mounted brake lights have also been mounted in motor vehicle body parts, such as in rear decks, spoilers, and roofs. An example of mounting an illumination device which is a motor vehicle body part is shown in U.S. Pat. No. 4,947,293, issued Aug. 7, 1990, to Glenn M. Johnson et al. Johnson et al. disclose a semi-trailer cargo vehicle perimeter clearance lighting system including light guides recessed in an indentation adjacent the roof of the semi-trailer cargo vehicle container body. The light guide is secured by clips and terminates in a cap. The light guide is configured to produce light flux propagation along its length as well as to emit light laterally. The light guides originate from an enclosure having a removable cover. The enclosure contains a light source and a concave surface. The concave surface focuses light flux from the light source into the end of the light guide opposite its terminal end. To some degree, mounting the illumination device in a motor vehicle body part addresses the obscurity of rearward vision. However, the placement of the illumination device in the motor vehicle body parts may be somewhat complex and may impose structural limitations on the motor vehicle design.

In addition to the aforementioned patents, other patents which are deemed of interest are as follows. U.S. Pat. No. 4,996,632, issued Feb. 26, 1991, to Wallace R. Aikens, discloses a multi-color illuminating system including an elongated light source disposed within an inner tube having a diffusion medium and a light-transmitting opening opposite the diffusion medium. The inner tube, in turn, is disposed within an outer tube having light-transmissive portions of differing colors. Light from the light source is reflected from the reflective film through the diffusion medium and the light-transmitting opening of the inner tube, and further through the light-transmissive opening of the outer tube against a sign or like object. To select a desired color for illumination, the outer tube is rotatable relative to the inner tube by a motor.

A motor vehicle warning light device is disclosed in U.S. Pat. No. 5,010,319, issued Apr. 23, 1991, to Erich Killinger. This reference discloses a warning light device including an optical fiber display which is mounted to a motor vehicle rear roof and operable from the proximity of the motor vehicle operator. The warning light device is connected to the motor vehicle electrical system. A plurality of optical fiber bundles can be illuminated through individually triggered light sources and/or color filters.

U.S. Pat. No. 5,193,893, issued Mar. 16, 1993, to Michael A. Mitko, discloses a motor vehicle hood deflector which supports a sign. End-light optical fiber cables supply light to the sign from the motor vehicle head lamps.

A significant problem remains in that center-high mounted brake lights are costly, are not aesthetically pleasing, and, for the most part, remain to block the motor vehicle operator's view. Size, location, aesthetic appearance, and cooperation with existing motor vehicle structure and design all need to be considered in devising a center-high mounted brake light. Visibility is especially critical in adverse weather conditions, such as in fog, rain, and snow.

It is desirable to present an illumination device for illuminating a motor vehicle which is relatively inexpensive and easy to install, highly visible, and which minimizes the obstruction of the motor vehicle operator's rearward view.

None of the above references, taken alone, or in any combination, is seen to describe the present invention.

SUMMARY OF THE INVENTION

The present invention is an optical fiber illumination device and, more particularly, an optical fiber illumination device for use with a motor vehicle. The optical fiber illumination device includes at least one optical fiber cable adapted to cooperate with existing motor vehicle body parts, one or more light sources for introducing light into the optical fiber cable, a lens through which light from the light source passes prior to entering the optical fiber cable for producing a colored light, electrical circuitry for energizing the light source, and a housing for containing the circuitry and the light source.

The fiber optical cable is preferably mountable about the periphery of the motor vehicle rear window, minimizing the obstruction of the motor vehicle operator's rearward vision. An optical fiber cable disposed about the periphery of the motor vehicle rear window is arranged over a large area and approximately at eye level so as to be highly visible to trailing motor vehicle operators. This provides a clear, distinct and brighter motor vehicle lighting system and increases the motor vehicle safety and improves the awareness of the motor vehicle operator which, in turn, reduces the risk of property damage and personal injury caused by motor vehicles.

Preferably, a red lens is provided and upon application of the motor vehicle brakes, a light source is energized which passes through the red lens to produce a red light which, in turn, enters into and is emitted from the optical fiber cable. Such a configuration would provide a highly visible emission of red light about the periphery of the motor vehicle rear window which would correspond to the red motor vehicle brake lights. This provides a supplemental warning indicator of braking motor vehicles for trailing motor vehicle operators.

A light source may be energized independent of the motor vehicle brake lights and may pass through an alternative lens of a color other than red, for example, an amber colored lens. Light from the light passing through the amber lens emits an amber colored light from the optical fiber cable, providing greater visibility of the motor vehicle for trailing motor vehicle operators. It is preferable that the light source passing through the amber colored lens be overridden by the light source passing through the red colored lens to permit the emission of a red colored light upon the application of the motor vehicle brakes so as to increase awareness of a braking motor vehicle.

The alternative colored lens may be operable in conjunction with the motor vehicle parking lights and/or the motor vehicle directional or turn signal lights. For example, the alternative light source may be energized upon energizing the parking lights and may be provided with a supplemental control device to energize and deenergize the alternative light source while the parking lights remain energized. Moreover, the alternative light source may be interrupted upon application of the right and left turn signals as well as the hazard flasher. For instance, the alternative light source may be deenergized when a directional lamp is illuminated, and may be energized when the directional lamp flashes off, thus producing an alternating flashing effect between the optical fiber cable and the directional lights. Alternatively, the optical fiber cable could illuminate simultaneously with the motor vehicle turn signals. Either configuration would emphasize to a trailing motor vehicle operator that a leading motor vehicle operator intends to turn. In either embodiment, the application of the motor vehicle brakes could either disable the alternative light source or alternatively energize and deenergize the alternative light source as the brake lights flash off and on, providing a highly visible indicator of both brake and directional lights.

The optical fiber illumination device is not limited in its application to the aforementioned embodiments, but may be employed to illuminate motor vehicle body parts, such as wheels or wheel coverings. In the former embodiments, side-light optical fiber cables would be employed. In the later embodiments, end-light optical fiber cables wold be employed. Similar to that of the former embodiments, the later embodiment would also become energized or deenergized depending upon application of the motor vehicle brakes, directional signals, parking and/or running lights, and headlights.

The housing of either one of the optical fiber illumination devices according to the present invention may be located in a convenient location, such as in the motor vehicle trunk or hood compartment. The mounting of the housing in an inconspicuous location provides an aesthetically appealing optical fiber illumination device which further minimizes obstruction of the motor vehicle operator's rearward vision.

The optical fiber illumination device may be retrofit on existing motor vehicles. The optical fiber illumination device cooperates with existing motor vehicle body parts and may be easily installed with little or no modification to the existing motor vehicle body.

Accordingly, it is a principal object of the invention to provide an optical fiber illumination device adapted to cooperate with existing motor vehicle body parts.

It is another object that a fiber optical cable be mountable about the periphery of the motor vehicle rear window to minimize obstruction of the motor vehicle operator's rearward vision.

It is a further object that the optical fiber cable be arranged over a large area and approximately at eye level so as to be highly visible to operators of trailing motor vehicle and provide a clear, distinct and brighter motor vehicle lighting system.

Another object is that a red lens be provided, whereupon application of the motor vehicle brakes, a light source is energized which passes through the red lens to produce a highly visible emission of red light about the periphery of the motor vehicle rear window which would correspond to the red motor vehicle brake lights.

Another object is that a light source be energized independent of the motor vehicle brake lights and that light from such a light source pass through an alternatively colored lens, whereupon light passing through the alternatively colored lens emits an alternative colored light from the optical fiber cable, providing greater visibility of the motor vehicle for trailing motor vehicle operators.

Yet another object is that the alternative colored light source be overridden by the light source passing through the red colored lens to permit the emission of a red colored light upon the application of the motor vehicle brakes so as to increase awareness of a braking motor vehicle.

Another object is that the alternative colored light source may be operable in conjunction with the motor vehicle parking lights and/or the motor vehicle directional or turn signal lights, whereupon the alternative light source may be energized upon energizing the parking lights.

Another object is that the alternative colored light source may be interrupted upon application of the right and light turn signals as well as the hazard flasher and upon application of the motor vehicle brakes, providing a highly visible indicator of both brake and directional lights.

Another object is that the optical fiber illumination device be employed to illuminate motor vehicle body parts, especially the wheels and tires of a motor vehicle.

Another object is that the optical fiber illumination device be aesthetically appealing and minimize obstruction of the motor vehicle operator's rearward vision.

Still another object is that the optical fiber illumination device may be retrofit on existing motor vehicles, cooperate with existing motor vehicle body parts, and be easily installed with little or no modification to existing motor vehicle body parts.

It is an object of the invention to provide improved elements and arrangements thereof in an apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Where possible, similar reference characters denote corresponding features throughout the attached drawings.

DETAILED DESCRIPTION OF THE PREFERRED EMBODIMENTS

Figure 1:
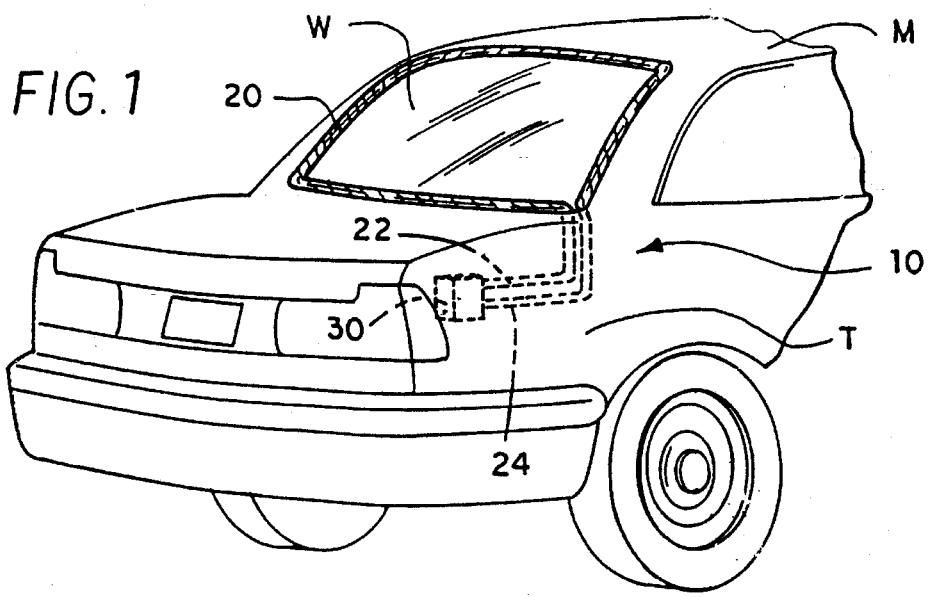
FIG. 1 is an environmental view of a light fiber illumination device according to the present invention.

The present invention is a light fiber illumination device 10 for use with a motor vehicle M. As shown in FIG. 1, the illumination device 10 includes a light fiber or a round optical fiber side-light cable 20 which forms a continuous loop about the periphery of the motor vehicle rear window W. The optical fiber cable 20 has two input ends 22, 24. Each one of the ends 22, 24 terminates in a control box or light source box 30 located in a motor vehicle storage area, such as the trunk compartment T. The light source box 30 would be provided with a removable closure or cover (not shown) to protect the contents therein from exposure when secured thereto and to offer access to the contents therein when removed therefrom.

Figure 2:
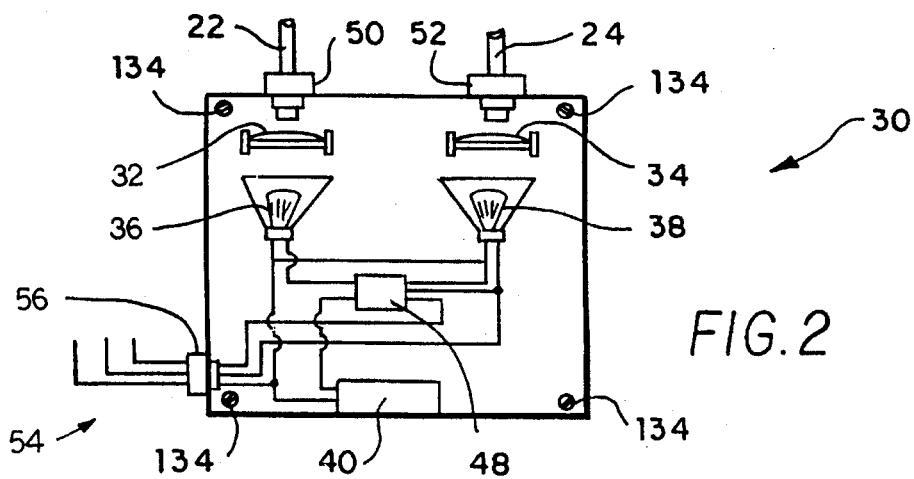
FIG. 2 is a front elevation of a light source box of the light fiber illumination device.

As shown in FIG. 2, the light source box 30 contains two lenses 32, 34, two 12 volt halogen lamps 36, 38, a ventilation fan 40, and two normally closed (N/C) switches 42, 44 (shown in FIG. 3), a normally open (N/O) switch 46 (also shown in FIG. 3), and a relay 48.

Each one of the halogen lamps 36, 38 is arranged to emit light through a respective one of the lenses 32, 34. Each one of the optical fiber cable ends 22, 24 terminates adjacent a respective one of the lenses 32, 34. The relay 48 physically controls the operation of the switches 42, 44, 46 (shown in FIG. 3) which, in turn, control the operation of each one of the halogen lamps 36, 38. The ventilation fan 40 supplies ambient air internally of the light source box 30 to maintain the device 10 at a suitable operating temperature.

Figure 3:
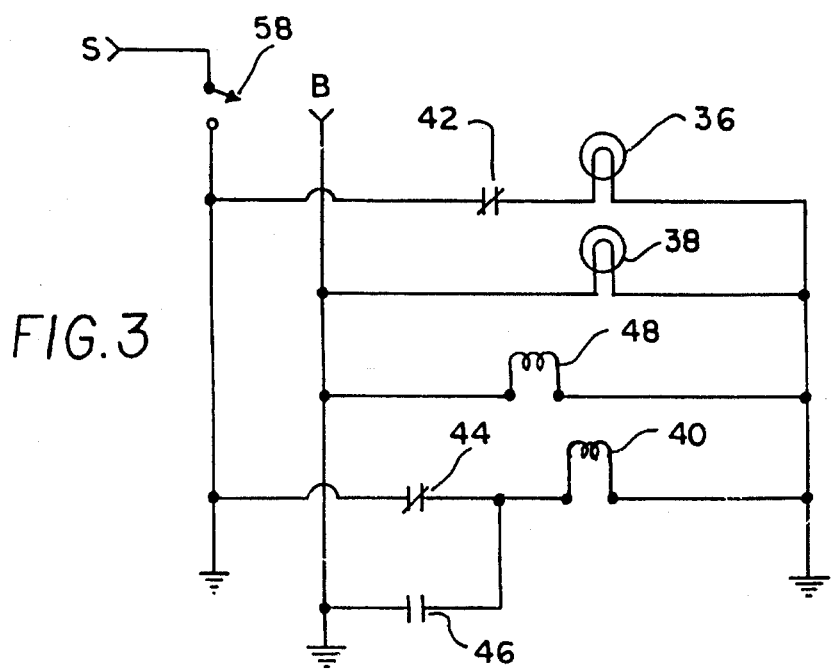
FIG. 3 is a schematic representation of a circuit configuration of a light fiber illumination device according to a first embodiment of the present invention.

A circuit configuration according to a first embodiment of the present invention is shown in FIG. 3. In this embodiment, a first one of the halogen lamps 36 and the ventilation fan 40 are connected parallel to one another and in parallel with the motor vehicle parking light circuit P through N/C switches 42, 44. A toggle switch 58 facilitates as a secondary control for the first halogen lamp 36 and the ventilation fan 40. The first halogen lamp 36 is energized and the ventilation fan 40 is actuated only when both the parking light circuit P is energized and the toggle switch 58 is closed.

A second one of the halogen lamps 38, the ventilation fan 40, and the relay 48 are connected in parallel with one another and in parallel with the motor vehicle brake light circuit B. The ventilation fan 40 is connected in parallel with the motor vehicle brake light circuit B through the N/O switch 46. Upon application of the motor vehicle brakes, the motor vehicle brake light circuit B is energized which, in turn, energizes the relay 48 to open the N/C switches 42, 44 and to close the N/O switch 46, thereby deenergizing the first halogen lamp 36 and energizing the second halogen lamp 38, while continuing the operation of the ventilation fan 40. Upon release of the motor vehicle brakes, the relay 48 is deenergized so as to permit the switches 42, 44, 46 to return to their respective normally closed and opened positions, and the first halogen lamp 36 again becomes energized and the second halogen lamp 38 becomes deenergized. The ventilation fan 40 is energized under both conditions, that is, whether the first or second halogen lamp 36, 38 is illuminated.

By switching the toggle switch 58 to an opened position, the first halogen lamp 36 and the ventilation fan 40 become deenergized. Even with this portion of the circuit deenergized, an application of the motor vehicle brakes energizes both the second halogen lamp 38 and the ventilation fan 40.

Referring to FIG. 2, upon energizing the first halogen lamp 36, light passes through a first one of the lenses 32 into the optical fiber cable first end 22, and further through the optical fiber cable 20 (shown more clearly in FIG. 1). The first lens 32 is preferably a colored lens of a color other than red. As the light passes through the optical fiber cable 20, light of the color of that lens 32 is emitted from the optical fiber cable 20 so as to be visible from without the motor vehicle M.

Upon energizing the second halogen lamp 38, the first halogen lamp 36 is deenergized and light passes through a second one of the lenses 34 into the optical fiber cable second end 24, and further through the optical fiber cable 20 (shown more clearly in FIG. 1). The second lens 34 is preferably red in color. As the light passes through the optical fiber cable 20, a red light is emitted from the optical fiber cable 20 so as to be visible from without the motor vehicle M.

Figure 4:
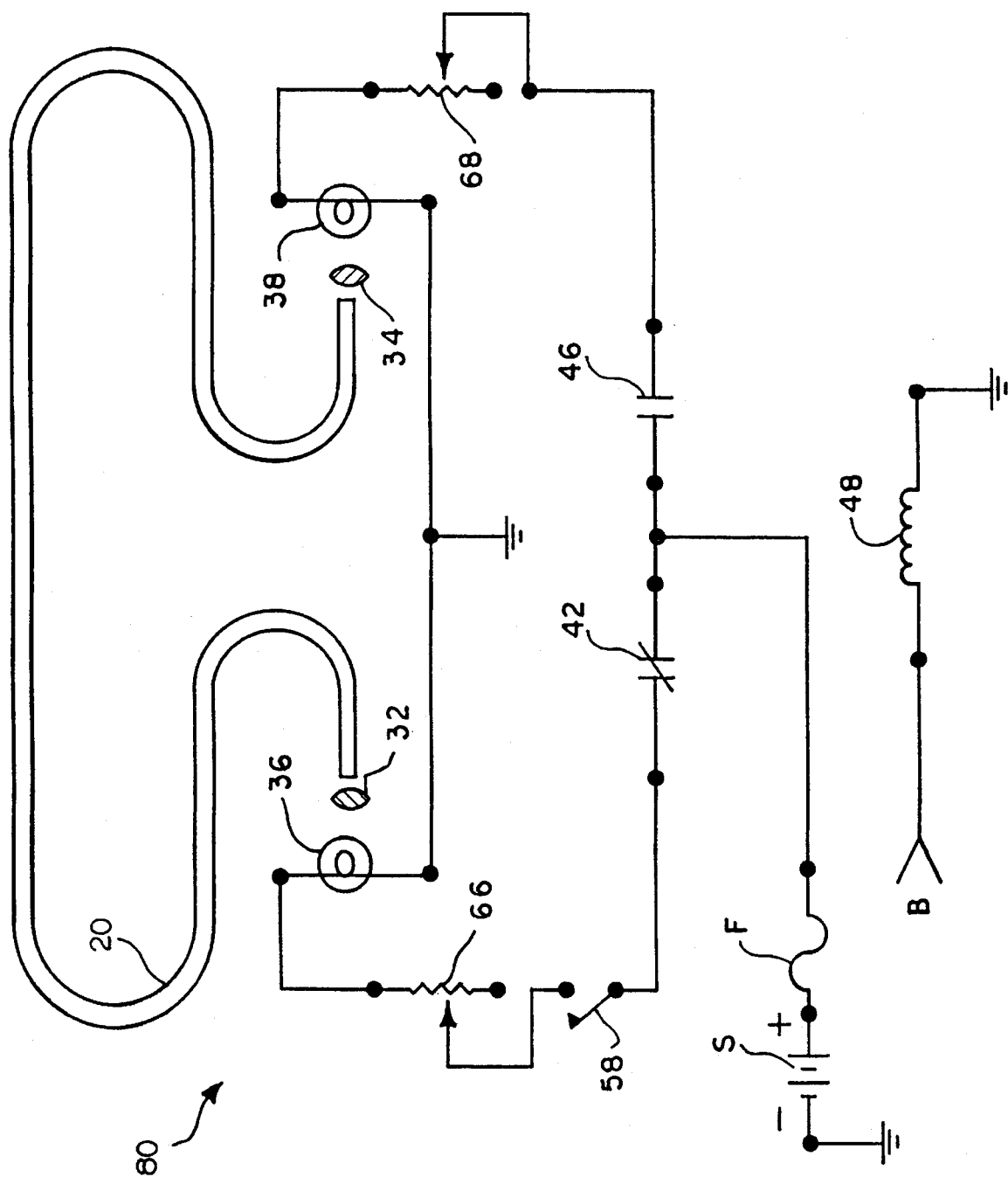
FIG. 4 is a schematic representation of a circuit configuration according to a second embodiment of the light fiber illumination device.

FIG. 4 shows a circuit configuration according to a second embodiment of the light fiber illumination device 60. In this embodiment, first and second halogen lamps 36, 38 are connected in parallel with one another and in series with a 12 volt source S through a circuit protection device F. The first halogen lamp 36 is connected in series with the 12 volt source through a N/C switch 42. The second halogen lamp 38 is connected in series with the 12 volt source S through a N/O switch 46.

Similar to that of the first embodiment 10 mentioned above, a toggle switch 58 is connected in series with the first halogen lamp 36 to control the operation of the first halogen lamp 36. The second halogen lamp 38 is energized upon the application of the motor vehicle brakes. When the motor vehicle brakes are applied, the first halogen lamp 36 is disabled through the actuation of the relay 48 which opens the N/C switch 42. As the N/C switch 42 is opened, the relay 48 simultaneously closes the N/O switch 46 to energize the second halogen lamp 38. In order for the first halogen lamp 36 to be illuminated, the toggle switch 58 must be closed. However, whether the toggle switch 58 is opened or closed, the application of the motor vehicle brakes energizes the second halogen lamp 38.

Unlike the first embodiment 10, the second embodiment 60 includes two variable resistors or potentiometers 66, 68 for varying the degree of illumination of each of the halogen lamps 36, 38. A first one of the potentiometers 66 is connected in series with the first halogen lamp 36 and a second one of the potentiometers 68 is connected in series with the second halogen lamp 38. In this way, the degree of illumination of each of the halogen lamps 36, 38 may be varied independently of the other and hence, the amount of light being emitted from each halogen lamp 36, 38 through the optical fiber cable 20 is independently variable.

Figure 5:
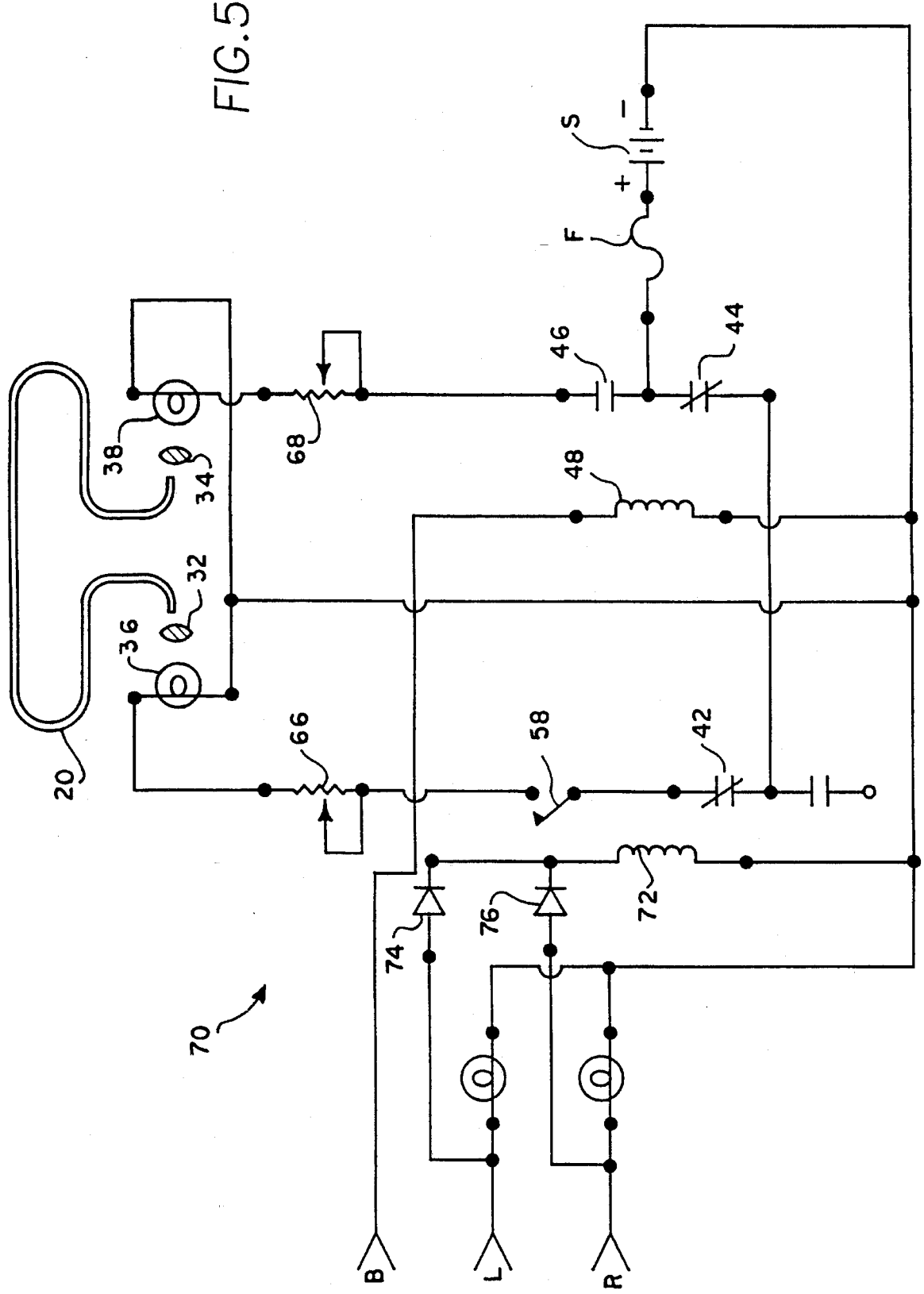
FIG. 5 is a schematic representation of a circuit configuration according to a third embodiment of the light fiber illumination device.

A circuit configuration according to a third embodiment of the light fiber illumination device 70 is shown in FIG. 5. First and second 12 volt halogen lamps 36, 38 are each connected in parallel with one another and in series with a circuit protection device F and a 12 volt source S. The first halogen lamp 36 is further connected in series with a first potentiometer 66, a toggle switch 58, a first N/C switch 42, and a second N/C switch 44. The second halogen lamp 38 is further connected in series with a second potentiometer 68 and a N/O switch 46. A first relay 48 is connected in parallel with the brake light circuit B. A second relay 72 is connected in parallel with both the right and left directional or turn signal circuits R, L respectively through first and second diodes 74, 76.

In operation, the first halogen lamp 36 is energized by closing the toggle switch 58 which permits current to flow from the 12 volt source S through the circuit protection device F, both N/C switches 42, 44, the first potentiometer 66, and the first halogen lamp 36. The intensity of the first halogen lamp 36 may be varied by varying the resistance offered by the first potentiometer 66, thereby varying the light intensity flowing through the first lens 32 which, in turn, varies the light being emitted from the optical fiber cable 20.

The application of the motor vehicle brakes energizes the first relay 48 to open the first N/C switch 42 and to close the N/O switch 46. This deenergizes the first halogen lamp 36 and energizes the second halogen lamp 38. The intensity of the second halogen lamp 38 may likewise be varied by varying the resistance offered by the second potentiometer 68, thereby varying the light intensity flowing through the second lens 34 which, in turn, varies the light being emitted from the optical fiber cable 20. Similar to that of the first two embodiments 10, 60, the second lens 34 of the third embodiment is preferably red in color.

In addition to the first halogen lamp 36 being disabled by the application of the motor vehicle brakes, it is disabled through the application of either the left or the right turn signal. Upon applying either the left or right turn signal, the second relay 72 is actuated for a period of time in which each of the left or right turn signals are energized. The actuation of the second relay 72 opens the second N/C switch 44 to deenergize the first halogen lamp 36. Hence, as the motor vehicle turn signals flash on, the first halogen lamp 36 flashes off, and as the motor vehicle turn signals flash off, the first halogen lamp 36 flashes on. An application of the motor vehicle brakes disables the first halogen lamp 36 altogether.

The two diodes 74, 76 isolate the left and right turn signal circuits L, R from one another. The second diode 76 blocks current flow from the left turn signal circuit L to the right turn signal circuit R, and the first diode 74 blocks current flow from the right turn signal circuit R to the left turn signal circuit L, thereby preventing the right turn signal lamps from being energized upon energizing the left turn signals, and vice versa.

Figure 6:
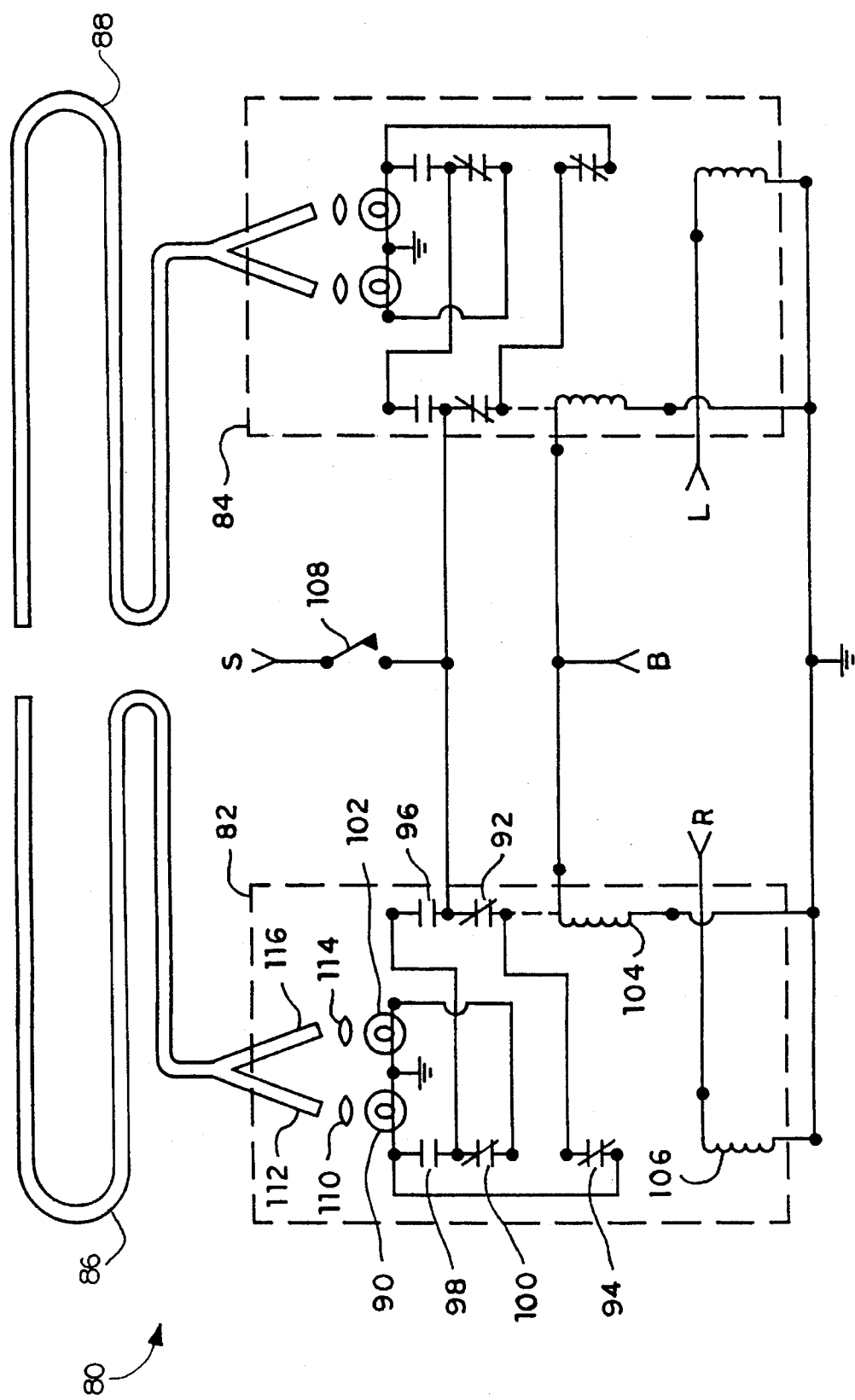
FIG. 6 is a schematic representation of a circuit configuration according to a fourth embodiment of the light fiber illumination device.

FIG. 6 shows a circuit configuration according to a fourth embodiment of the light fiber illumination device 80. Two separate and independent circuits 82, 84 and two optical fiber cables 86, 88 are included in this embodiment 80.

A first one of the circuits or a right circuit 82 is operable to transmit light through a first one of the optical fiber cables or a right optical fiber cable 86. The light enters into a first end of the optical fiber cable 86 and a second end of the optical fiber cable is sealed or capped off to prevent light from escaping therefrom. This circuit 82 includes a first branch having a first 12 volt halogen lamp 90 connected in series with a first N/C switch 92 and second N/C switch 94. A second branch is connected in parallel with the first branch and includes a first N/O switch 96 connected in series with a second N/O switch 98 and in parallel with a third N/C switch 100. The second N/O switch 98 is connected in series with the first halogen lamp 90. In addition, the third N/C switch 100 is connected in series with a second 12 volt halogen lamp 102. The circuit 82 further includes a first relay 104 connected in parallel with the motor vehicle brake light circuit B and a second relay 106 connected in parallel with the motor vehicle right directional or turn signal circuit R. A 12 volt source S and a toggle switch 108 are connected in series with both branches of the circuit 82.

In operation, upon closing the toggle switch 108, the first branch of the first circuit is energized. Current flows through the first and second N/C switches 92, 94 to illuminate the first halogen lamp 90. Light emitted from the first halogen lamp 90 passes through a first lens 110 into a first branch 112 of the first optical fiber cable 86 and further through the first optical fiber cable 86. The color of the light emitted from the first optical fiber cable 86 is determined by the color of the first lens 110. The color of the first lens 110 may be any number of desired colors but is preferably not of the color red.

Upon application of the motor vehicle brakes, the first branch is deenergized and the second branch is energized. This is accomplished by energizing the first relay 104. The first relay 104 is energized by the motor vehicle brake light circuit B to open the first N/C switch 92 and close the first N/O switch 96. Current flows through the first N/O switch 96 and the third N/C switch 100. This disables the first halogen lamp 90 and energizes the second halogen lamp 102. Light emitted from the second halogen lamp 102 passes through a second lens 114 into a second branch 116 of the first optical fiber cable 86 and further through the first optical cable 86. The second lens 114 is preferably red in color so as to emit red light through the first optical cable 86 upon application of the motor vehicle brakes.

Upon application of the motor vehicle right turn signal, the first branch of the first circuit 82 is disabled. This is accomplished by energizing the second relay 106. The second relay 106 is energized by the motor vehicle right turn signal circuit R to open the second and third N/C switches 94, 100, and close the second N/O switch 98. The first halogen lamp 90 is deenergized upon the illumination of the right turn signal and is energized when the right turn signal flashes off.

Upon application of both the motor vehicle brakes and the right turn signal, the first halogen lamp 90 is energized and the second halogen lamp 102 is disabled upon the illumination of the right turn signal and when the right turn signal flashes off, the first halogen lamp 90 is disabled and the second halogen lamp 102 is energized. This configuration permits the first optical fiber cable 86 to emit light from the first halogen lamp 90 upon closing the toggle switch 108, to emit light from the second halogen lamp 102 upon applying the motor vehicle brakes, to inhibit the emission of light when the right turn signal is applied, and to alternatively emit light from the first and second halogen lamps 90, 102 when both the motor vehicle brakes and right turn signal are applied.

A second one of the circuits or a left circuit 84 is operable to transmit light through a second one of the optical fiber cables or a left optical fiber cable 88. The second circuit 84 is similar in configuration and operation to that of the first circuit 82, as described above. Hence, to simplify the specification, a description of the second circuit 84 is omitted.

Figure 7A:
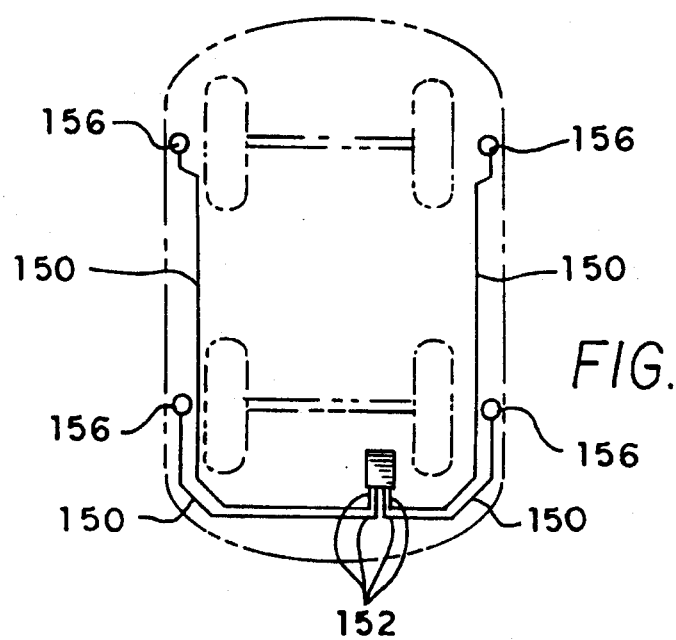
FIG. 7A is a schematic representation of a fifth embodiment of the light fiber illumination device.
Figure 7C:
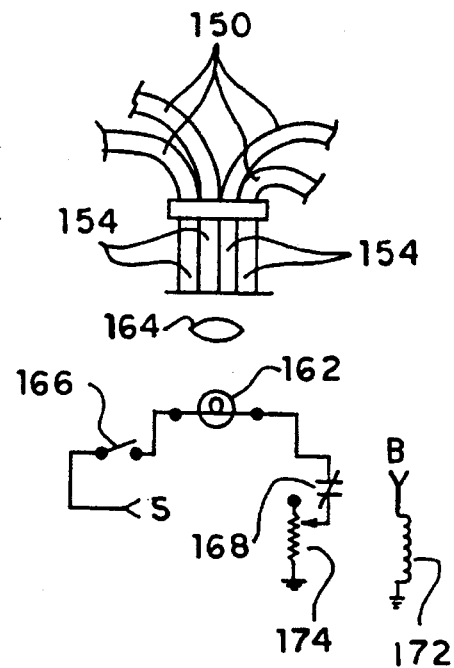
FIG. 7C is a schematic representation of a circuit configuration according to the fifth embodiment of the light fiber illumination device.
Figure 7B:
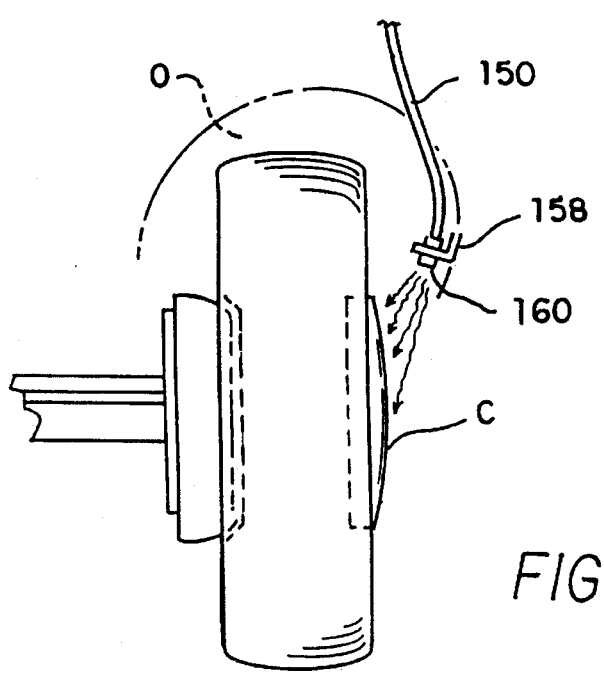
FIG. 7B is a diagrammatic representation of a motor vehicle wheel well having a light fiber illumination device installed therein.

A fifth embodiment of the present invention is shown in FIGS. 7A, 7B and 7C. Four end-light optical fiber cables 150 are included in this embodiment. A first end 152 of each of the four optical fiber cables 150 is bundled and the bundle terminates in the light source box 154. A second end 156 of each of the optical fiber cable 150 terminates at a respective one of the motor vehicle wheel well openings O. A holding bracket 158 and a diffusion lens 160 are positioned in each one of the motor vehicle wheel well openings O, such as is shown in FIG. 7B. Each of the optical fiber cable second ends 156 terminates adjacent a respective diffusion lens 160 to provide maximum illumination for each of the motor vehicle wheels or wheel coverings C. As shown in FIG. 7C, this embodiment requires a single 12 volt halogen lamp 162 and accompanying lens 164. The halogen lamp 162 is connected in series with a toggle switch 166, a N/C switch 168, and a 12 volt source S. A relay 172 is provided which is connected in parallel with the motor vehicle brake light circuit B which opens the N/C switch 168 upon application of the motor vehicle brakes, thereby ceasing the illumination of the wheel covers C. Similar to that of an aforementioned embodiment, a potentiometer 174 may be provided to vary the illumination of the wheel coverings C.

Additionally, the optical fiber illumination device as shown in FIG. 7A may be designed to steadily illuminate the wheels with one hue of light during normal operation, i.e. without the directional signals or the brake lights activated, and to blink on and off in when the directional signals and/or brake light circuits are activated. In this embodiment, the wheel illumination would function in the same fashion as that described above for the side-light optical cable.

Figure 13:
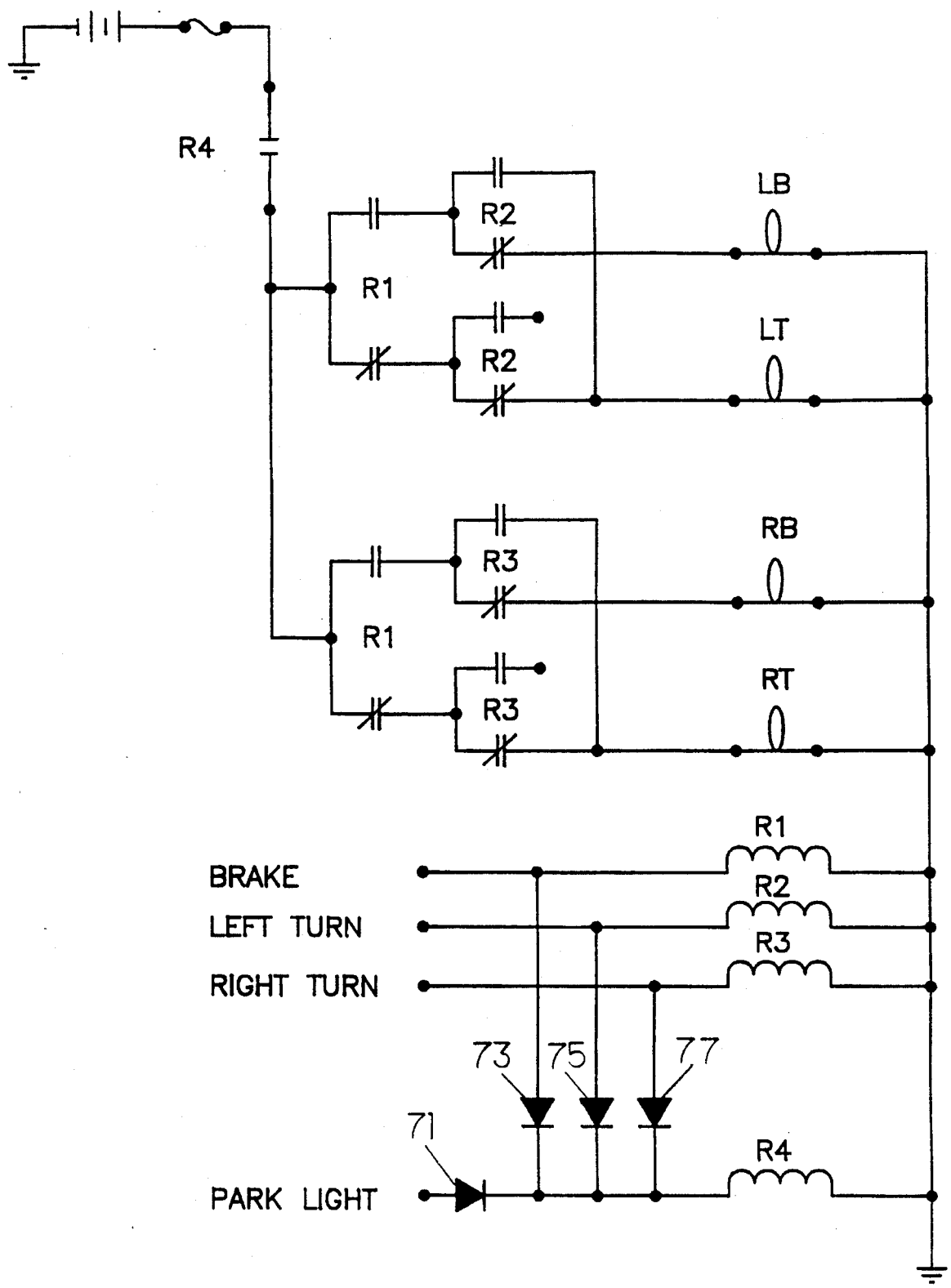
FIG. 13 is a schematic representation of a circuit configuration according to the another embodiment of the light fiber illumination device.

FIG. 13 shows an electrical circuit to operate the optical fiber illumination device shown in FIG. 7A. Here, the circuitry is very similar to that shown in FIG. 6, with some modifications to include the brake light circuit, the turn signal circuit, and the parking light circuit. The circuit includes two pairs of a normally open switch and a normally closed switch R1. The switches R1 are responsive to application of the brakes via relay R1. One pair of switches R1 is further coupled to another two pairs of a normally open and a normally closed switch R2. The switches R2 are responsive to activation of the left-turn signal via relay R2. This branch of the circuit is connected to the left brake light circuit LB and the left turn signal circuit LT. The other pair of switches R1 is arranged in an identical parallel circuit designated R3, and is connected to the right brake light circuit RB and the right turn signal circuit RT. In the same fashion as R2, switches R3 are responsive to application of the right turn signal via relay R3. Both branches of the parallel circuit are operationally connected to the parking light circuit, and are responsive thereto via N/O switch R4, and its associated relay R4. The various brake light, turn signal and parking light circuits are isolated from one another by diodes 71, 73, 75, and 77.

Two modes of operation are envisioned for this embodiment of the invention. The first mode of operation would illuminate the wheels and the surrounding area with a yellow light during normal cruising conditions. Activation of the turn signals would cause the two light assemblies on either the right-hand or left-hand side of the vehicle to blink in time with the turn signals. Activation of the brake light circuit would change the yellow illumination to red. Activation of both the brakes and the turn signals would cause the wheel lights on the signalled side of the vehicle to flash between a yellow light and a red light, while the two light assemblies on the non-signalled side of the vehicle would shine uninterrupted red light on the wheels.

The second mode of operation would illuminate all of the vehicle wheels with a faint color (perhaps a faint red) during normal cruising conditions. Activation of the brakes would then illuminate the tires with a bright color (perhaps a bright red). Activation of the turn signals would flash the lights on the signalled side of the vehicle between red and yellow, as described above. An electrical circuit for accomplishing this second mode of operation is shown in FIG. 16.

Figure 16:
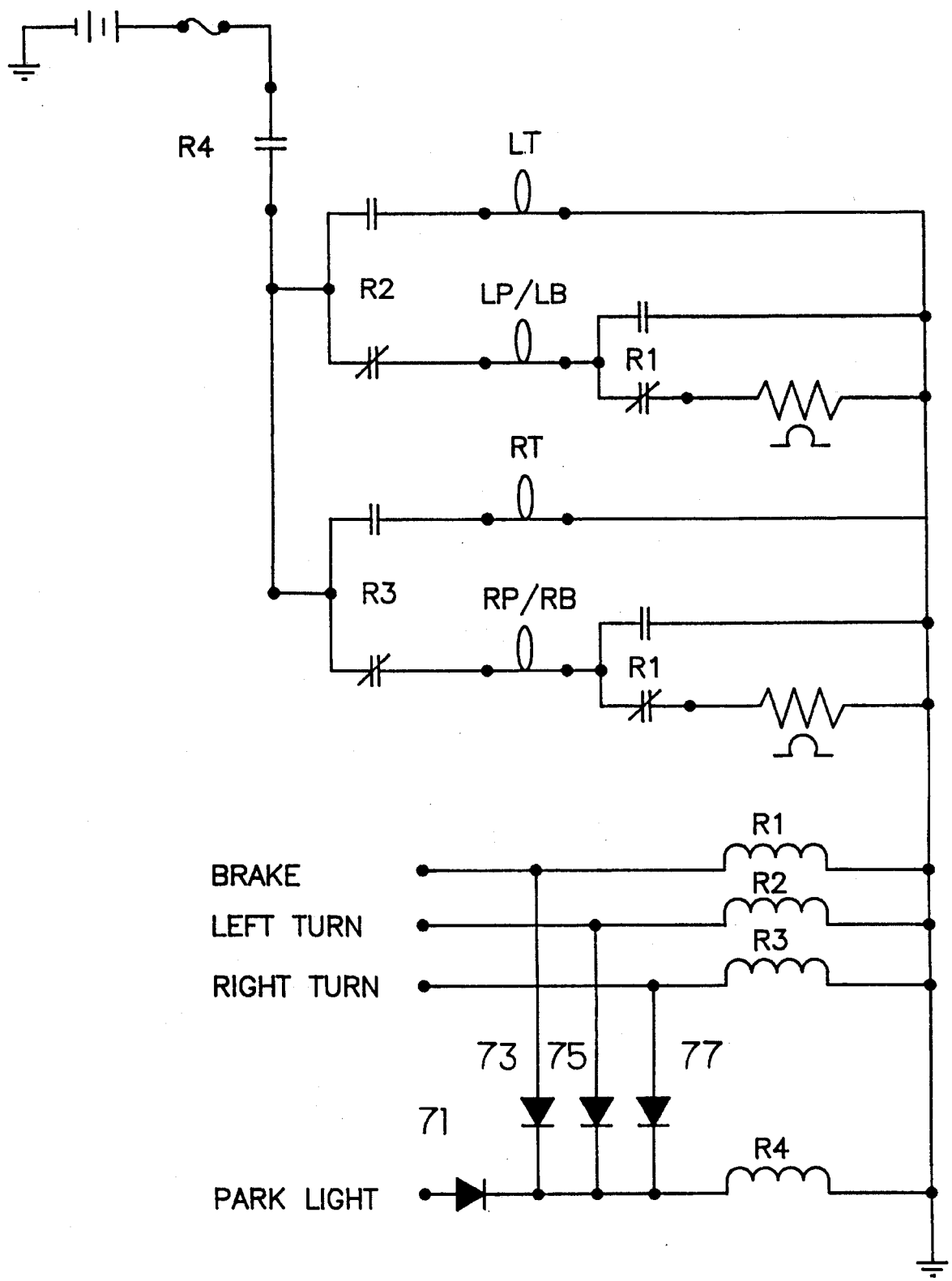
FIG. 16 is a schematic representation of a circuit configuration according to the another embodiment of the light fiber illumination device.

It is readily appreciated that the circuit shown in FIG. 16 is analogous to the circuit shown in FIG. 13 and described above. The FIG. 16 circuit includes paired N/O and N/C switches and associated relays R1, R2, and R3, which are responsive to the application of the brakes, the left turn signal, and the right turn signal, respectively. Here, however, the relative location of switches R1 and R2 has been reversed, and a resistor has been added to one arm of each of the R1 branches of the circuit. Additionally, the left parking lights LP and the right parking lights RP have been added to the circuit. This will allow all of the tires to be illuminated with a faint light when cruising, and a bright light when the brakes are applied.

Figure 14:
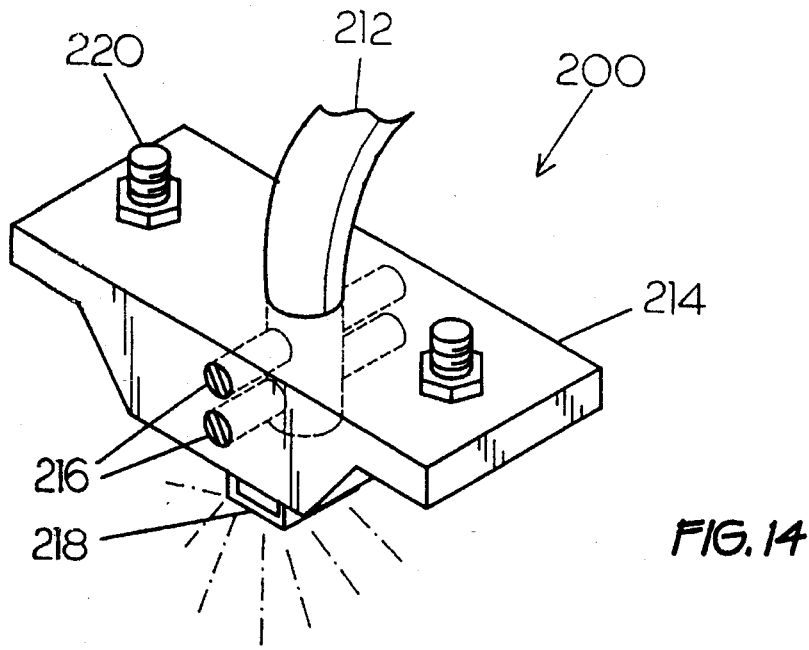
FIG. 14 is a perspective view of the optical fiber illumination device mounted on a mounting block which is intended to be located within a wheel well of a motor vehicle.

FIG. 14 depicts a mounting 200 for fastening the fiber optic cable within the wheel well of a vehicle. The mounting includes mounting block 214 having an aperture therethrough, threaded fasteners 220, and set screws 216. The fiber optic cable 212 from the light source passes through the mounting block via the aperture. The set screws 216 are used to adjust the angle of the light exiting the fiber optic cable. This allows the illumination device to be adjusted to provide maximum visual impact. Lens 218 caps the fiber optic cable to both focus (or diffuse) the light as needed, and to protect the end of the fiber optic cable.

Figure 15:
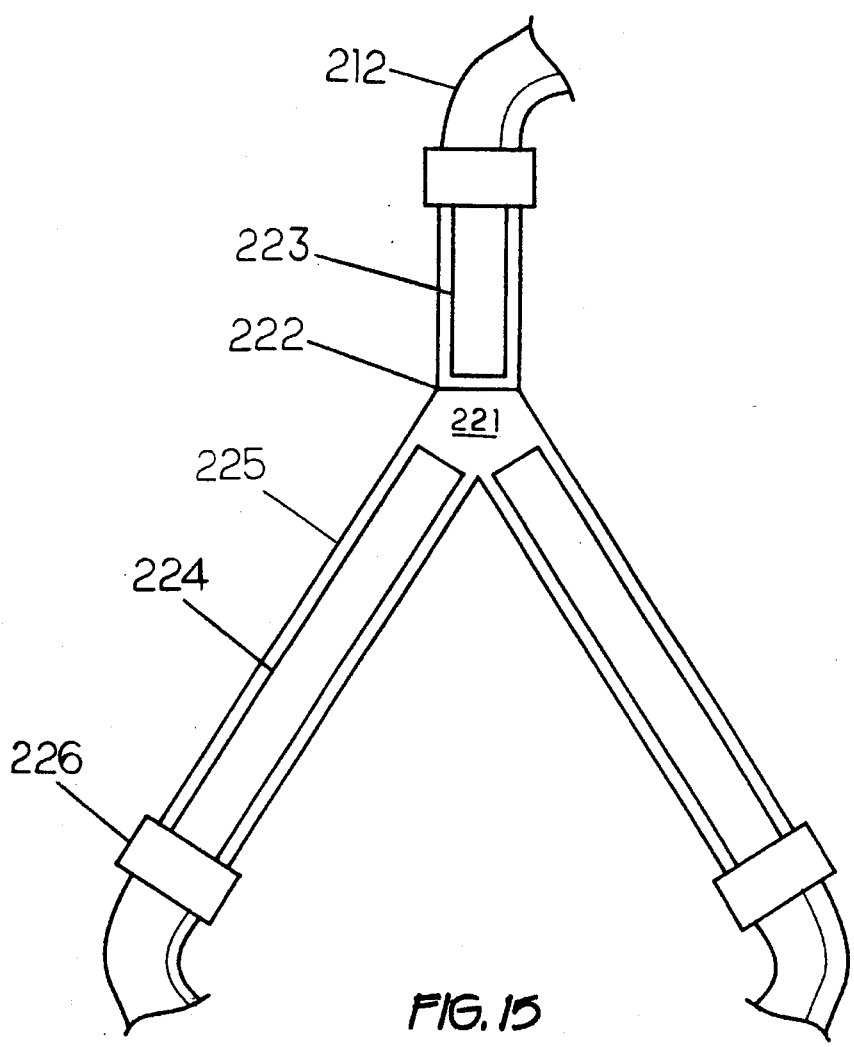
FIG. 15 is an assembled view of a Y-shaped fiber optic cable junction.

FIG. 15 depicts a Y-shaped connector for joining two fiber optic cables into a single fiber optic cable, which would then be inserted into the mounting block shown in FIG. 14. The connector is substantially symmetrical, and includes two threaded connectors 226, two input fiber optic cables 224, and two input cable covers 225. The fiber optic cables 224 are located inside the cable covers 225, and converge On a plano convex lens 222. The lens 222 functions to focus the light into an output fiber optic cable 223. A small amount of space 221 is provided between the ends of the input fiber optic cable 224, and the lens 222. This arrangement allows for different hues of color to be formed by mixing the wavelengths of light impinging on lens 222.

Figure 8:
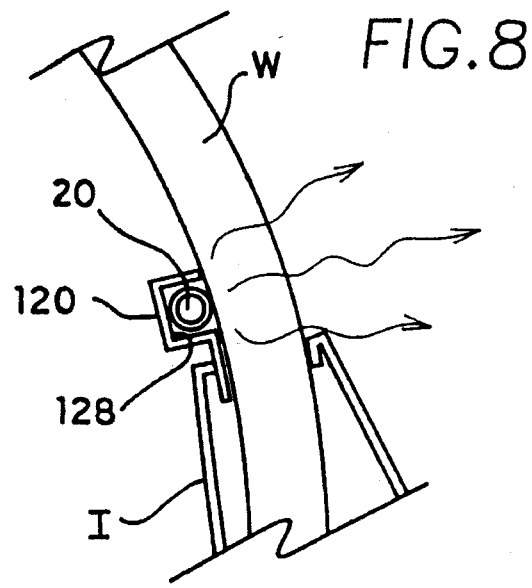
FIG. 8 is a side elevation of a mounting device for use in mounting the optical fiber cable about the periphery of the motor vehicle window.
Figure 9:
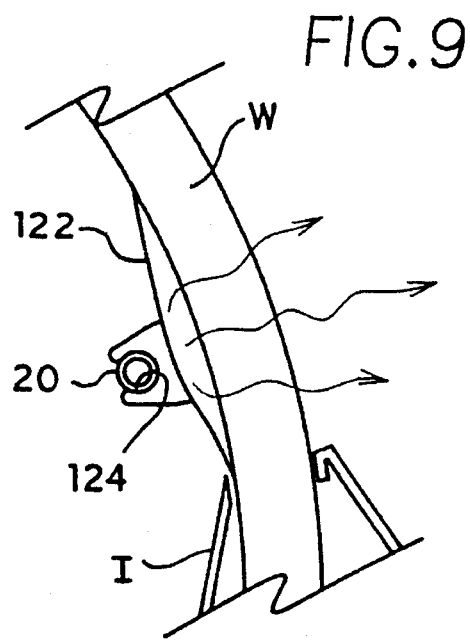
FIG. 9 is a side elevation an alternative mounting device for use in mounting the optical fiber cable about the periphery of the motor vehicle window.
Figure 10:
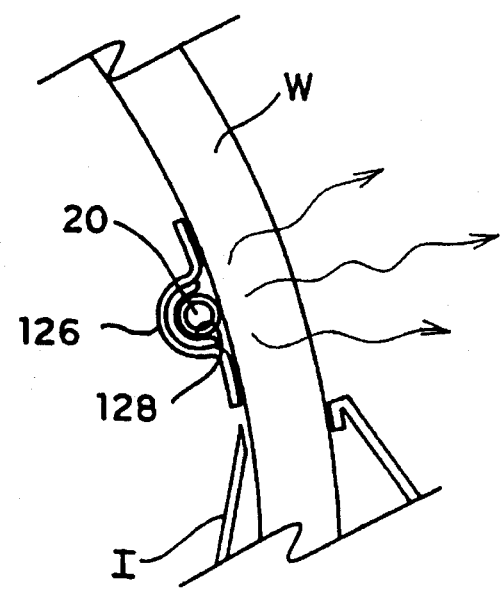
FIG. 10 is a side elevation of another alternative mounting device for use in mounting the optical fiber cable about the periphery of the motor vehicle window.

Referring now to FIG. 8, the fiber optical cable 20 is shown mounted to the motor vehicle rear window through the use of a metal channel 120 supported between the motor vehicle rear window W and the motor vehicle rear window interior trim I. Alternatively, suction cups 122 having a channel 124 for receiving the optical fiber cable 20 therein may secure the optical fiber cable 20, as is shown in FIG. 9. As another alternative, an adhesive tape material 126 may be used, as is shown in FIG. 10. Regardless of the mounting device used to install the optical fiber cable 20, it is preferred that light being emitted from the optical fiber cable 20 be visible only from without the motor vehicle M so as to not distract the motor vehicle operator. The mounting device could also possess a reflective surface 128 for reflecting light emitted from the optical fiber cable 20 exteriorly of the motor vehicle M.

Figure 11:
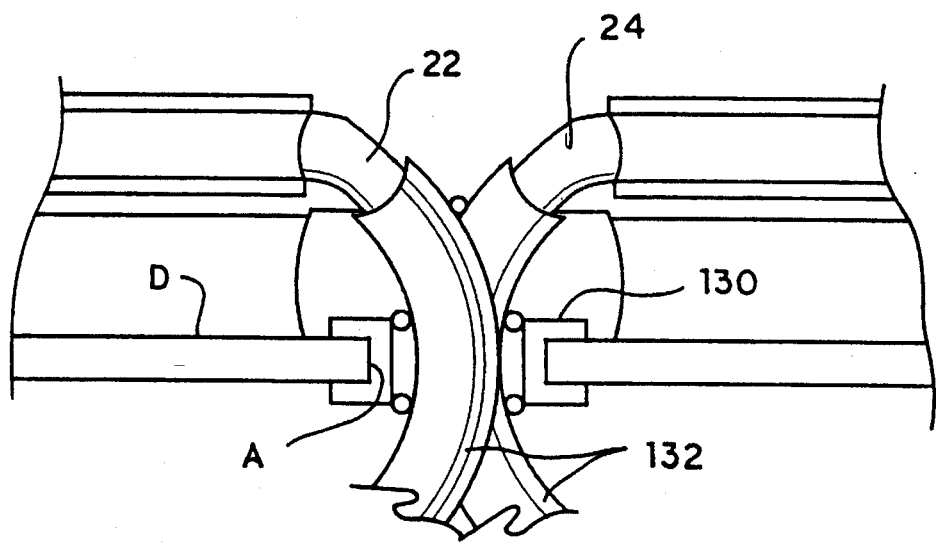
FIG. 11 is a side elevation of the optical fiber cable being routed into the motor vehicle trunk through the motor vehicle packaging shelf, the motor vehicle packaging shelf is shown in cross-section.

The fiber optical cable ends 22, 24 are routed to the motor vehicle trunk T through one or more apertures A provided in the motor vehicle package shelf or rear dash board D, as is shown in FIG. 11. A grommet 130 would protect the optical fiber cable 20 from being chafed by the motor vehicle rear dash board D. Wrapping the optical fiber cable ends 22, 24, such as with the heat shrink tubing 132 shown, would prevent light from escaping from the optical fiber cable ends 22, 24.

The light source box 30 is mounted in a suitable location in the motor vehicle trunk T as is shown in FIG. 1 and 7A. The light source box 30 is preferably mounted through the use of the threaded fasteners 134 as are shown in FIG. 2. The optical fiber ends 22, 24 are routed into the light source box 30 through connectors 50, 52. Source wiring 54 supplies power to the halogen lights 36, 38, the ventilation fan 40, and the relay 48. The source wiring 54 is fed into the light source box 30 through a third connector 56. Each of the connectors 50, 52, 56 may secure the optical fiber cable ends 22, 24 and the wiring 54 to the light source box 30 while at the same time, reducing the risk of chafing to the same.

Figure 12:
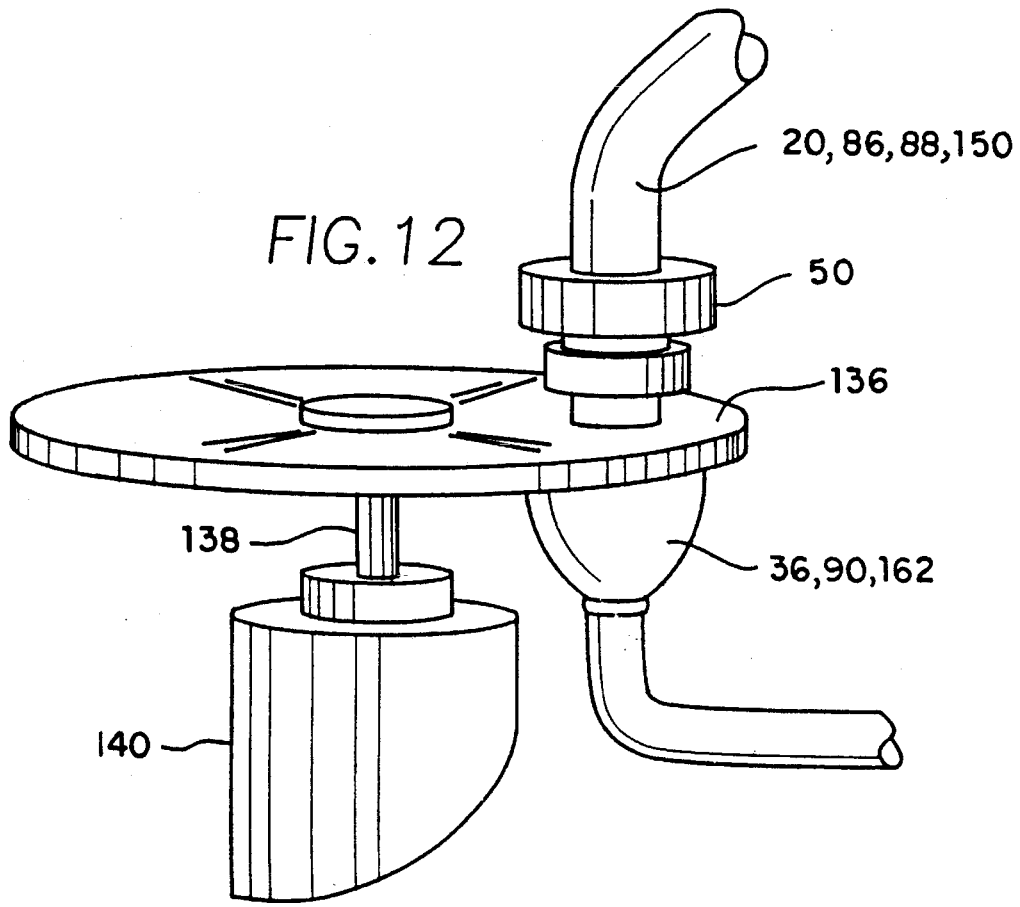
FIG. 12 is a diagrammatic representation of a multi-colored disk lens driven by a step motor.

Referring to FIG. 12, it should be understood that a multi-colored lens disk 136 may be substituted in any one of the aforementioned embodiments for the first lens 32, 110. The multi-colored lens disk 136 is shown to include an axle 138 driven by a step motor 140. The step motor 140 and the multi-colored lens disks 136 are both contained in the light source box 30. The step motor 140 is electrically powered and may be actuated to rotate the multi-colored lens disk 136 over a predetermined angular distance to select a desired color of light to be emitted by the optical fiber cable 20, 86, 88, 150 or may be driven continuously to continually change the light color. The step motor may be controlled independently by a separate toggle switch or may be controlled by the toggle switch 58, 108 controlling the various aforementioned circuits.

The first lens 32,110 of each embodiment is preferably of any color other than red. Red is the preferred color of the second lens 34, 114 which corresponds to the color of the motor vehicle brake light lens L, as is shown in FIGS. 1 and 7. The lenses 34, 36, 110, 114, 136 are preferably dichroic color lenses approved by state authorities and the Department of Transportation (DOT). It is to be understood that the present invention is not limited to the embodiments described above, but encompasses any and all embodiments within the scope of the following claims.

I claim:

1. An optical fiber illumination device having at least one illumination assembly, said assembly comprising:

at least one optical fiber cable, said optical fiber cable having at least one input and at least one output;

at least a first light source and a second light source arranged adjacent to said at least one input, said first light source being energized by a first electric circuit, said second light source being energized by a second electric circuit;

a first lens interposed between said first light source and said at least one input;

a second lens interposed between said second light source and said at least one input, said second lens possessing a filtering characteristic distinguishable from a distinguishing characteristic of said first lens;

a first control means for disabling said first light source, said first control means being responsive to said second electric circuit;

a light source box surrounding said at least one input of said at least one optical fiber cable, said first and second light sources, and said first and second lenses; and wherein said at least one output of said at least one optical fiber cable is positioned adjacent to a tire of a motor vehicle;

whereby light from said first and second light sources is transmitted through said at least one optical fiber cable to illuminate the tire of the motor vehicle.

2. The optical fiber illumination device according to claim 1, wherein said first electric circuit is a parking light circuit of a motor vehicle; and said first light source is energized when the parking light circuit of the motor vehicle is activated.

3. The optical fiber illumination device according to claim 2, wherein said second electric circuit is a brake light circuit of a motor vehicle; and said second light source is energized when the brake light circuit of the motor vehicle is activated, and said first control means disables said first light source when the brake light circuit of the motor vehicle is activated.

4. The optical fiber illumination device according to claim 3, further comprising a second control means for disabling said first light source, said second control means being responsive to a third electric circuit.

5. The optical fiber illumination device according to claim 4, wherein said third electric circuit is a directional signal circuit of a motor vehicle; and said second control means disables said first light source when the directional signal circuit of the motor vehicle is activated;

whereby said first light source is disabled when a directional signal light of the motor vehicle is activated, and said first light source is not disabled when a directional signal light of the motor vehicle is deactivated.

6. The optical fiber illumination device according to claim 5, wherein said first and second light sources are halogen lamps.

7. The optical fiber illumination device according to claim 5, wherein said first and second lenses are dichroic lenses.

8. The optical fiber illumination device according to claim 4, further comprising a second illumination assembly housed within said light source box;

said second illumination assembly having at least one optical fiber cable having at least one input, at least one output, a first and second light source energized by said first and said second electric circuits respectively, a first and second lens; and having a configuration substantially identical to said first illumination assembly;

wherein each of said at least one optical cables of said first and second illumination assemblies has a first and a second output; said first output of said at least one optical cable of said first illumination assembly positioned adjacent to a right-front tire of a motor vehicle, said second output of said at least one optical cable of said first illumination assembly positioned adjacent to a right-rear tire of the motor vehicle; said first output of said at least one optical cable of said second illumination assembly positioned adjacent to a left-front tire of the motor vehicle, said second output of said at least one optical cable of said second illumination assembly positioned adjacent to a left-rear tire of the motor vehicle.

9. The optical fiber illumination device according to claim 8, wherein said third electric circuit is a directional signal circuit of a motor vehicle; and said first light source of said first and second illumination assemblies is energized when the parking light circuit of the motor vehicle is activated;

said second light source of said first and second illumination assemblies is energized when the brake light circuit of the motor vehicle is activated; and said first control means disables said first light source of said first and second illumination assemblies when the brake light circuit of the motor vehicle is activated; and said second control means disables said first light source of each of said first and second illumination assemblies when the directional signal circuit of the motor vehicle is activated;

whereby said first light source of each of said first and second illumination assemblies is disabled when a directional signal light of the motor vehicle is activated, and said first light source of each of said first and second illumination assemblies is not disabled when a directional signal light of the motor vehicle is deactivated.

10. The optical fiber illumination device according to claim 9, wherein the directional signal circuit of the motor vehicle has a right-turn-indicating means and a left-turn-indicating means;

said first illumination assembly being responsive to the right-turn indicating means, and said second illumination assembly being responsive to the left-turn-indicating means.

11. The motor vehicle illumination device according to claim 10, wherein said first and said second control means cooperate such that when the brake light circuit of the motor vehicle is activated simultaneously with either the right-turn indicating means or the left-turn indicating means, in each of said first and second illumination assemblies said first light source is activated and said second light source is disabled when a directional signal of the motor vehicle is activated, and said first light source is disabled and said second light source not disabled when the directional signal of the motor vehicle is deactivated;

said first illumination assembly being responsive to the right-turn indicating means, said second illumination assemblies being responsive to the left-turn indicating means, each of said illumination assemblies responding in an identical fashion.

12. The motor vehicle illumination device according to claim 11, wherein said first and second light sources are halogen lamps.

13. The motor vehicle illumination device according to claim 12, wherein said first and second lenses are dichroic lenses.

* * * * *